(12) United States Patent
Raju et al.

(10) Patent No.: US 9,103,285 B2
(45) Date of Patent: Aug. 11, 2015

(54) PURGE SYSTEM, SYSTEM INCLUDING A PURGE SYSTEM, AND PURGE METHOD

(75) Inventors: Venugopala Raju, Karnataka (IN); Anil Kumar Sharma, Karnataka (IN); Indrajit Mazumder, Karnataka (IN); Bhaskar Pemmi, Karnataka (IN); Rajarshi Saha, Karnataka (IN)

(73) Assignee: General Electric Company, Schenectady, NY (US)

( * ) Notice: Subject to any disclaimer, the term of this patent is extended or adjusted under 35 U.S.C. 154(b) by 1257 days.

(21) Appl. No.: 12/983,397

(22) Filed: Jan. 3, 2011

(65) Prior Publication Data

US 2012/0167545 A1     Jul. 5, 2012

(51) Int. Cl.
F23R 3/36       (2006.01)
F02C 7/236      (2006.01)
F02C 7/228      (2006.01)

(52) U.S. Cl.
CPC .............. *F02C 7/2365* (2013.01); *F02C 7/228* (2013.01); *F05D 2260/602* (2013.01); *F23D 2209/30* (2013.01); *F23R 3/36* (2013.01)

(58) Field of Classification Search
CPC ...... F02C 7/228; F05D 2260/602; F23R 3/36; F23R 2209/03
USPC ......... 60/39.094, 34.463, 726, 727, 740, 742, 60/39.5, 39.52
See application file for complete search history.

(56) References Cited

U.S. PATENT DOCUMENTS

| | | | |
|---|---|---|---|
| 5,701,732 A | 12/1997 | Nesbitt et al. | |
| 6,145,294 A * | 11/2000 | Traver et al. | 60/776 |
| 6,438,963 B1 | 8/2002 | Traver et al. | |
| 7,074,033 B2 * | 7/2006 | Neary | 431/5 |
| 7,581,401 B2 * | 9/2009 | West et al. | 60/772 |
| 7,739,864 B2 * | 6/2010 | Finkenrath et al. | 60/39.52 |
| 8,397,509 B2 * | 3/2013 | Hwang | 60/723 |
| 8,813,470 B2 * | 8/2014 | Engesser | 60/39.094 |
| 2009/0061264 A1 * | 3/2009 | Agnew | 429/14 |
| 2009/0205326 A1 * | 8/2009 | Watson | 60/309 |
| 2010/0031668 A1 * | 2/2010 | Kepplinger | 60/780 |
| 2011/0179799 A1 * | 7/2011 | Allam et al. | 60/772 |
| 2013/0047627 A1 * | 2/2013 | Menzel | 60/780 |
| 2013/0119667 A1 * | 5/2013 | Christensen et al. | 290/52 |
| 2013/0145773 A1 * | 6/2013 | Kulkarni et al. | 60/783 |
| 2013/0229018 A1 * | 9/2013 | Karni et al. | 290/1 R |
| 2014/0083109 A1 * | 3/2014 | Oelfke et al. | 60/772 |
| 2014/0190179 A1 * | 7/2014 | Baker et al. | 60/780 |

* cited by examiner

*Primary Examiner* — Phutthiwat Wongwian
*Assistant Examiner* — Michael B Mantyla
(74) *Attorney, Agent, or Firm* — McNees Wallace & Nurick LLC

(57) ABSTRACT

A purge system and liquid fuel atomizing system, a system including a purge system and liquid fuel atomizing system, and a method of purging and atomizing are disclosed. The purging involves a first nozzle, a second nozzle, a third nozzle, and a staged compression system having a first stage and a second stage. The first stage is configured to selectively direct a first pressurized fluid stream to the first nozzle and the second nozzle. The second stage is configured to selectively direct a second pressurized fluid stream to the third nozzle.

18 Claims, 3 Drawing Sheets

PURGE SYSTEM, SYSTEM INCLUDING A PURGE SYSTEM, AND PURGE METHOD

FIELD OF THE INVENTION

The present invention is directed to purge systems and liquid fuel atomizing systems having nozzles, systems including purge systems and liquid fuel atomizing systems having nozzles, and methods of purging nozzles and atomizing fuels. More specifically, the present invention is directed to systems and methods of purging nozzles and atomization of liquid fuels using a staged compression system.

BACKGROUND OF THE INVENTION

Environmental and energy related policies, regulations, legislation, and treaties continue to address carbon emissions. As carbon emissions continue to become more frequently monitored, carbon capture and sequestration is likely to be an element of any future greenhouse gas compliance plan.

Natural gas and integrated gasification combined cycle systems (also known as IGCC systems) separate $CO_2$ at atmospheric or slightly elevated pressures. The separated $CO_2$ can then be compressed and captured as high pressurized $CO_2$ that can be used for enhanced oil recovery by deep oil injection. Additional sources of $CO_2$ that are substantially devoid of any known detrimental environmental or energy effects are also desirable.

Industrial gas turbines are often capable of alternatively running on liquid and gaseous fuels, e.g., natural gas. These gas turbines have fuel supply systems for both liquid and gas fuels. The gas turbines generally do not burn both gas and liquid fuels at the same time. Rather, when the gas turbine burns liquid fuel, the gas fuel supply is turned off. Similarly, when the gas turbine burns gaseous fuel, the liquid fuel supply is turned off. Fuel transitions occur during the operation of the gas turbine as the fuel supply is switched from liquid fuel to gaseous fuel, and vice versa.

Gas turbines that burn both liquid and gaseous fuel require a fuel purge system to clear the fuel nozzles in the combustors. The liquid fuel supply system is turned off when a gas turbine operates on gaseous fuel. When the liquid fuel system is turned off, the purge system operates to flush out any remaining liquid fuel from the nozzles of the combustor and provide continuous cooling airflow to the nozzles. As shown in FIG. 1, in a known purge system 100, pressurized air from the discharge of a gas turbine compressor or a separate dedicated purge air compressor 103 clears atomizing air passages, liquid fuel nozzles, and water injection nozzles. During liquid fuel operation, an atomizing air compressor 101 further boosts the pressure of purge air for liquid fuel atomization. Similarly, the gas fuel supply system is turned off when a gas turbine operates on liquid fuel. When the gas fuel supply system is turned off, the purge system 100 operates to flush out any remaining gas fuel from the gas fuel nozzles of the combustor and provides continuous cooling airflow to the nozzles.

A purge system, a system including a purge system, and purge method capable of utilizing $CO_2$ would be desirable in the art.

BRIEF DESCRIPTION OF THE INVENTION

According to an embodiment, a system includes a first set of nozzles, a second set of nozzles, a third set of nozzles, and a staged compression system having at least a first stage and a second stage. The first stage is configured to selectively direct a first pressurized fluid stream to the first set of nozzles and the second set of nozzles. The second stage is configured to selectively direct a second pressurized fluid stream to the third set of nozzles.

According to another embodiment, a purge system includes a first set of nozzles, a second set of nozzles, a third set of nozzles, and a carbon capture system having a staged compression system. The staged compression system has at least a first stage and a second stage. The first stage is configured to receive a first $CO_2$ stream from the carbon capture system and direct the first $CO_2$ to the first set of nozzles and the second set of nozzles. The second stage is configured to receive a second $CO_2$ stream and direct the pressurized $CO_2$ to the third set of nozzles. The second $CO_2$ stream is greater in pressure than the first $CO_2$ stream.

According to another embodiment, a purge system includes a first, second, and third set of nozzles. The system is configured to selectively direct a first pressurized fluid stream to the first set of nozzles and the second set of nozzles from a first stage of a staged compression system. In addition, the system is configured to selectively direct a second pressurized fluid stream to the third set of nozzles from a second stage of the staged compression system.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a purge system and liquid fuel atomizing system, a system including a purge system and liquid fuel atomizing system, and a purge method and liquid fuel atomizing method capable of utilizing $CO_2$. The purge system and liquid fuel atomizing system according to the disclosure include nozzles configured to operate with a staged compression system. Embodiments of the present disclosure flush gas fuel or liquid fuel and/or water while reducing or eliminating backflow of combustion materials, provide continuous cooling of one or more nozzles, atomize air without using a gas turbine compressor and atomizing air compressor, improve efficiency by using a staged compression system for providing pressurized streams, reduce costs by eliminating components of the systems such as an atomizing air compressor or purge air compressor, and/or increase expandable flow in gas turbines due to the addition of $CO_2$ thereby increasing performance by increasing gas turbine output.

Figure 1:
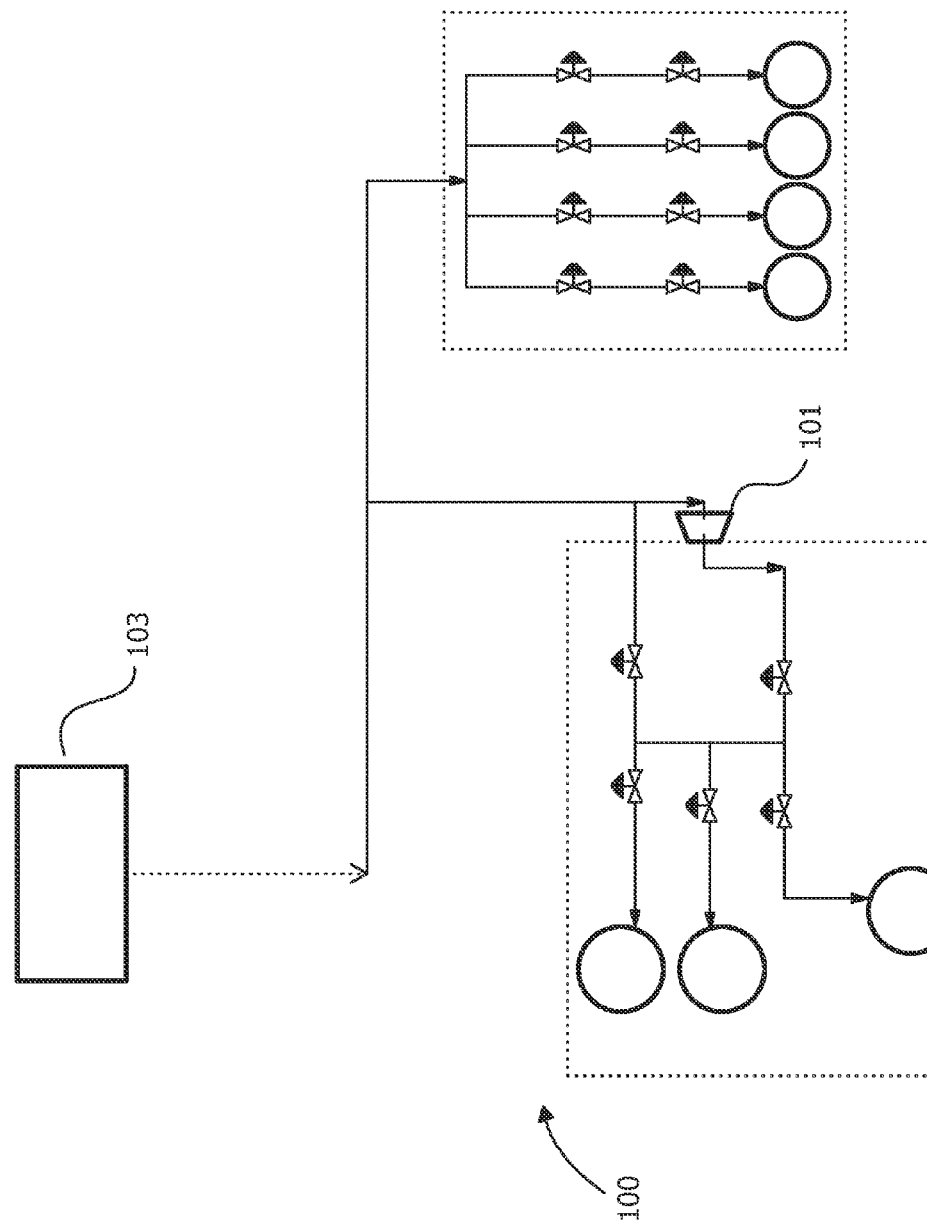
FIG. 1 schematically shows a prior art purging system with a purge stream provided by a gas turbine in a power generation system.
Figure 2:
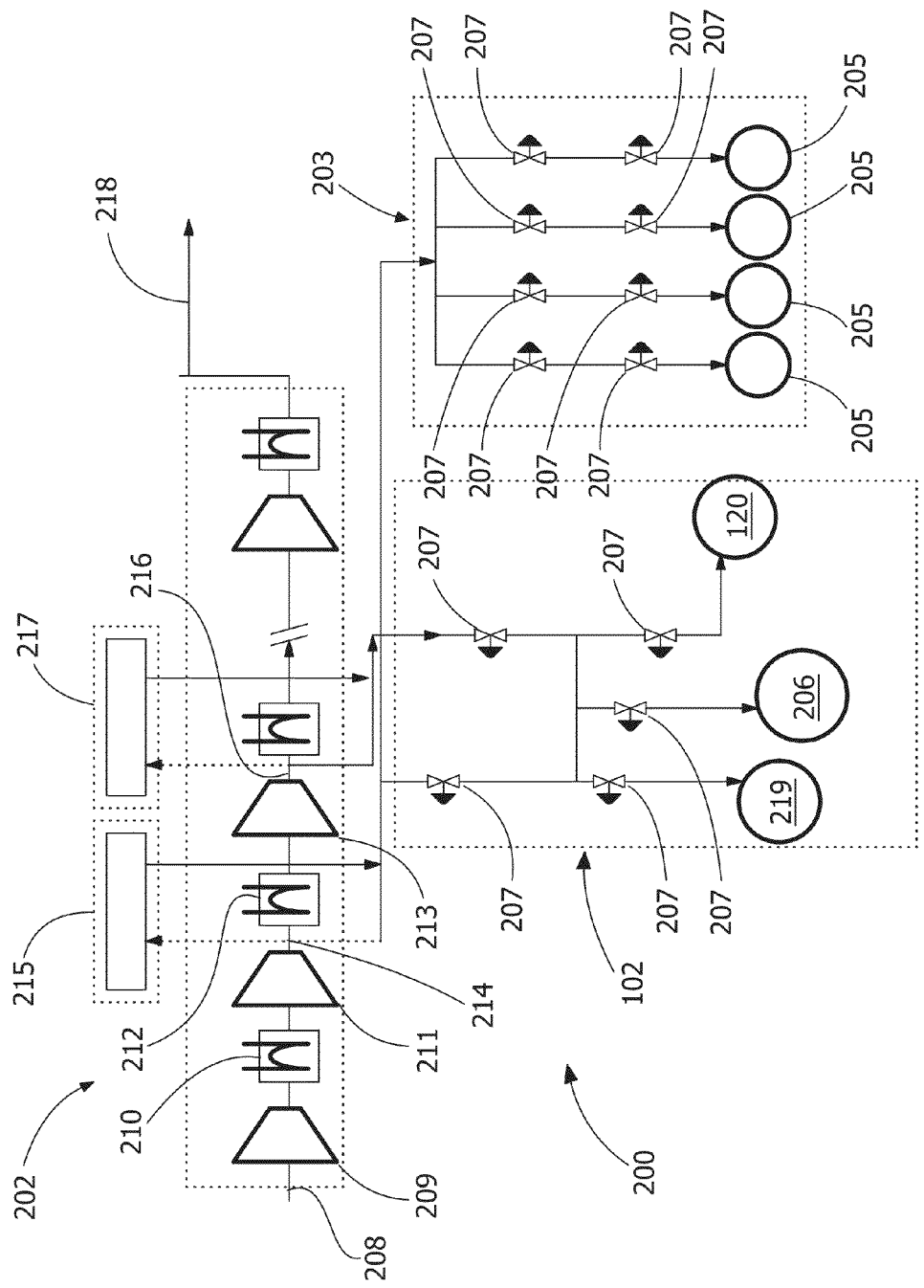
FIG. 2 schematically shows an exemplary system according to the disclosure.

FIG. 2 schematically shows an exemplary purge system 200 for use with a power generation system. The exemplary purge system 200 includes a liquid fuel system 102, a gaseous fuel system 203, and a staged compression system 202 for directing a pressurized fluid to the liquid fuel system 102 and/or the gaseous fuel system 203. The purge system 200 is configured for use with the power generation system and/or a carbon capture system. In one embodiment, the power generation system includes a gas turbine, a combustor, a controller, and/or any other suitable components. The gas turbine can be part of a simple or combined cycle system.

The combustor can be an annular array of combustion chambers (for example, cans), each including at least a set of one or more liquid fuel nozzles 219, at least a set of one or more atomizing nozzles 120 connected to the liquid fuel system 102 and at least a gas fuel nozzle 205 connected to the gaseous fuel system 203. Combustion is initiated within the cans at points slightly downstream of the nozzles 120 and 205. Air flows around and through the cans to provide oxygen for combustion and for cooling. Moreover, water injection nozzles 206 are arranged within the combustor to reduce $NO_x$ emission during liquid fuel operation. The combustor is in fluid communication with the gas turbine.

When the combustor combusts liquid fuel, the gaseous fuel system 203 is inoperative and purging of the liquid fuel system 102 is prevented by one or more valves 207. The valves 207 may be any suitable valves or combination of valves including, but not limited to, purge valves, soft purge valves, three-way valves. When the combustor is switched to combust gaseous fuel or at any time when the liquid fuel system 102 is not operating, the liquid fuel system 102 may be purged by selectively opening one or more of the valves 207. Purging can include directing a pressurized fluid through the liquid fuel system 102. The pressurized fluid can pass through a strainer to remove contaminants and protect the contaminant-sensitive components from start-up and commissioning debris. When the combustor is switched to combust liquid fuel, water in a water injection system is injected by opening water injection nozzles 206 based upon the emission desired.

FIG. 2 shows an exemplary embodiment of the purge and liquid fuel atomizing system 200 (for example, a $CO_2$ purge and liquid fuel atomizing system) configured to flush liquid fuel and/or water, configured to provide continuous cooling of one or more nozzles, configured to atomize liquid fuel without a gas turbine compressor and atomizing air compressor, or combinations thereof. An exemplary embodiment of the purge system 200 includes a liquid injection system in fluid communication with a first nozzle (for example, the liquid fuel nozzle 219), a water injection system in fluid communication with a second nozzle (for example, the water injection nozzle 206), a liquid fuel atomization system (for example, atomizing nozzle 120) and the staged compression system 202.

The staged compression system 202 is in fluid communication with or is a portion of an effluent handling system, such as the carbon capture system. The effluent handling system can be configured for compressing and/or sequestering a stream (for example, $CO_2$ stream 208) and providing the stream to the staged compression system 202. The staged compression system 202 compresses the fluid (for example, captured $CO_2$) in several stages to raise the fluid pressure to a supercritical level for converting it into liquid phase. The staged compression system 202 include an intercooler (for example, first staged intercooler 210, second intercooler 212, etc.) that maintains compressed fluid temperature at a predetermined level after each compression stage. The staged compression system 202 directs a portion of pressurized fluid from a first stage and a second stage through one or more valves 207 to the liquid fuel nozzle 219, the water injection nozzle 206, the gas fuel nozzle 205, and the atomizing nozzle 120, respectively, based upon the gas turbine operating mode. The pressurized fluid may be air, $CO_2$, or any suitable non-combustible fluid. In one embodiment where the pressurized fluid consists essentially of $CO_2$, expandable flow in the gas turbine increases the output of the gas turbine. The staged compression system 202 is in fluid communication with the valves 207 and provides continuous pressure to the valves 207, thereby preventing backflow of combustion products from the combustor arranged and disposed to receive liquid fuel from the liquid fuel nozzle 219.

In one embodiment, the staged compression system 202 is a portion of the carbon capture system. In the carbon capture system, $CO_2$ is separated then introduced to the staged compression system 202 as the $CO_2$ stream 208. In the staged compression system 202, the $CO_2$ is compressed by a first staged compressor (for example, a low pressure compressor 209), cooled by a first staged intercooler 210, and directed through a second staged compressor (for example, a medium pressure compressor 211) to form a first stream 214 having a predetermined pressure and temperature. A portion of the first stream 214 is directed to a first accumulator 215 and/or to one or more of the valves 207 so that purging and atomizing of liquid fuel can be done based upon selective opening and closing of one or more valves 207. The first accumulator 215 provides continuous supply of pressurized fluid in case of failure of the staged compression system 202. The remaining portion of the first stream 214 is directed through a second staged intercooler 212 and a third compressor (for example, a high pressure compressor 213) to form a second stream having a predetermined temperature and pressure. The pressure of the first stream 214 is lower than the pressure of the second stream 216. A portion of the second stream 216 is directed to a second accumulator 217 and/or to one or more of the valves 207. The remaining portion of the second stream 216 is directed through additional staged intercoolers and compressors to form a supercritical stream 218. Any suitable number of compressors and/or intercoolers may be used. Likewise, additional compressors before, after, or between the compressors and/or intercoolers may be used. In one embodiment, $CO_2$ exiting the staged compression system 202 is at a predetermined pressure (for example, its supercritical pressure or about 2215 psia). The increase in pressure may liquefy the $CO_2$. The $CO_2$ exiting the staged compression system 202 as the supercritical stream 218 may be stored or transported. In one embodiment, the liquid fuel system 102 and/or the purge system 200 is devoid of a purge compressor. Alternatively, demand on an included purge compressor can be reduced thereby improving overall efficiency.

The pressurized fluid from the second stream 216 is at a greater pressure than the pressurized fluid from the first stream 214. The pressurized fluid is directed selectively by one or more valves 207. Adjustments by a controller or manually to the valves 207 permit the pressurized fluid to be directed to the liquid fuel system 102. Similarly, the ratio of the pressurized fluid from the first stream 214 and the pressurized fluid from the second stream 216 directed to the nozzles can be adjusted. This adjustability permits the temperature and/or pressure to be increased and decreased to a predetermined temperature and/or a predetermined pressure based upon a signal from the controller or manual determinations. Depending upon the selective opening and closing of the valves 207, the first pressurized fluid stream 214 purges a liquid fuel or gas fuel manifold and/or nozzles during gas fuel operation. Similarly, the second pressurized fluid stream 216 atomizes liquid fuel during liquid fuel operation.

The pressurized fluid may be directed to atomize liquid fuel in the atomizing passage 120. In one embodiment, the flow rate is adjusted in a manner similar to the adjustment of temperature and pressure, thereby increasing or decreasing the atomization of liquid fuel based upon pressure in the atomizing passage 120. In one embodiment, the pressurized fluid permits the liquid fuel system 102 and/or the purge system 200 to be devoid of an atomizing air compressor. Alternatively, demand on an included atomized air compressor can be reduced thereby improving overall efficiency.

The controller can adjust operational parameters of the liquid fuel system 102, the gaseous fuel system 203, the staged compression system 202, any other component disclosed herein, any other suitable component, or combinations thereof. These adjustments can adjust temperature, pressure, flow rate, power output, or any other suitable properties of the streams or portions of streams in the process.

Figure 3:
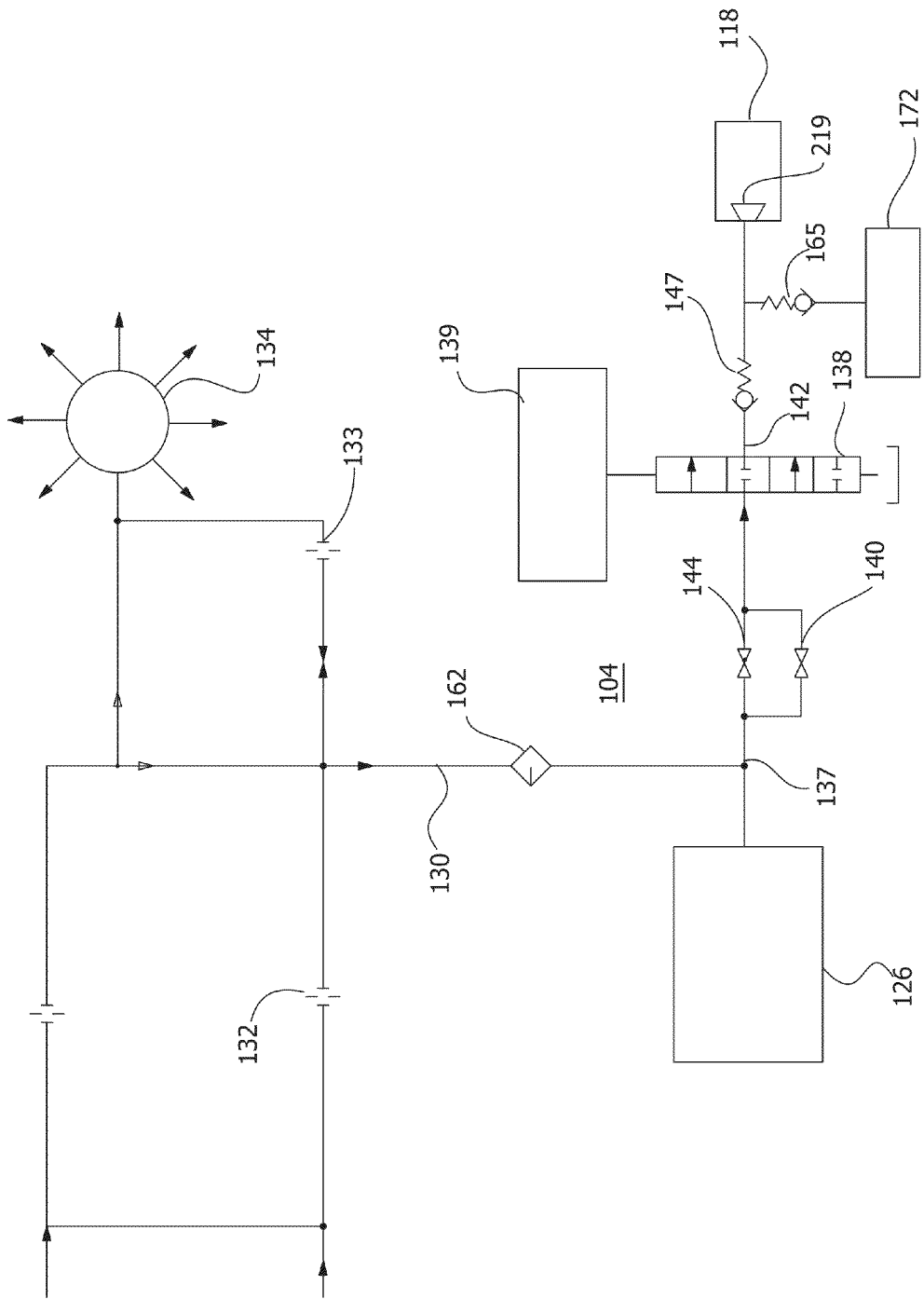
FIG. 3 schematically shows an exemplary system according to the disclosure.

Purging of the liquid fuel system 102 and gaseous fuel system 203 can be performed by any suitable purge system operating in conjunction with the staged compression system 202. In one embodiment, the system involves controlling the first stream 214, the second stream 216, and/or other streams using one or more three-way valves. In another embodiment, as shown in FIG. 3, check valves, multiport valves, and/or tuning orifices are used. For example, a liquid fuel purge system 104 blows pressurized fluid (for example, $CO_2$) through the liquid fuel nozzle(s) 219 of the liquid fuel system 102 to purge liquid fuel and provide a flow of substantially continuous cooling fluid to the liquid fuel nozzles 219. A tuning orifice 132 meters the flow of the pressurized fluid. The pressurized fluid is routed through piping 130, a strainer 162, a Tee 137 that splits the pressurized fluid between the liquid fuel purge system 104, and a water purge system 126 (which includes the water injection nozzle 206). A liquid fuel purge multiport valve 138 routes the boosted pressure pressurized fluid to the liquid fuel nozzle(s) 219. The multiport valve 138 is controlled by a solenoid 139 that is operated by a controller. At each combustion chamber, end cover check valves 147 prevent liquid fuel from backflowing into the purge system 104.

Liquid fuel check valves 165, at least one for each combustion chamber, isolate the liquid fuel supply 172 during purge operations and prevent pressurized fluid from backflowing into the liquid fuel system 102. By preventing pressurized fluid from entering the liquid fuel system 102, the check valves 165 reduce or eliminate air-fuel interfaces with the fuel supply.

When the liquid fuel purge system 104 is initiated, a solenoid controlled soft purge valve 140 is open simultaneously with the multiport valve 138 by the solenoid valve 139. The soft purge valve 140 opening rate can be mechanically controlled by a metering valve in an actuation line. The soft purge valve 140 opens over a relatively long duration of time to minimize load transients resulting from the burning of residual liquid fuel blown out into a combustor 118 from the purge system piping 142 and the liquid fuel nozzle(s) 219. The soft purge valve 140 is a low flow rate valve, to reduce the boosted pressure pressurized fluid flowing. After the soft purge valve has been opened a predetermined period of time, a high flow purge valve 144 is opened to allow the boosted pressurized fluid to flow at the proper system pressure ratio. The high flow purge valve may be a two-way ball valve 144.

In addition, pressurized fluid is provided through another tuning orifice 133 to an atomizing air manifold 134 and to the atomizing air passage 120 of the liquid fuel nozzles 219. Pressurized fluid from the atomizing air passes through the strainer 162 to remove contaminants from the pressurized fluid and protect the contaminant sensitive components from start up and commissioning debris.

While only certain features and embodiments of the invention have been shown and described, many modifications and changes may occur to those skilled in the art (for example, variations in sizes, dimensions, structures, shapes and proportions of the various elements, values of parameters (for example, temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system, comprising:
  a gas turbine engine comprising:
    a first set of nozzles;
    a second set of nozzles;
    a third set of nozzles;
    a combustor;
    wherein one of the first, second and third sets of nozzles include at least one liquid fuel nozzle, and one of the first, second and third sets of nozzles include at least one gaseous fuel nozzle;
  a carbon capture system comprising a staged compression system having at least a first stage of compression and a second stage of compression;
  wherein the first stage of compression is configured to selectively direct a first pressurized fluid stream to purge the first and second sets of nozzles in response to a first operating mode;
  and wherein the second stage of compression is configured to selectively direct a second pressurized fluid stream to purge the third set of nozzles in response to a second operating mode;
  wherein the first and second pressurized fluid streams are non-combustible and include $CO_2$ at a concentration greater than the concentration of $CO_2$ in air;
  wherein the second pressurized fluid stream is greater in pressure than the first pressurized fluid stream.

2. The system of claim 1, further comprising the combustor, wherein the combustor is arranged and disposed to receive liquid fuel from the first set of nozzles and gaseous fuel from the second set of nozzles.

3. The system of claim 1, wherein the first pressurized fluid stream cools the first set of nozzles and the second set of nozzles.

4. The system of claim 1, wherein the second set of nozzles includes a water injection nozzle.

5. The system of claim 1, wherein the first set of nozzles includes a gaseous fuel nozzle.

6. The system of claim 1, wherein the third set of nozzles includes an atomizing nozzle.

7. The system of claim 1, wherein the staged compression system is in fluid communication with one or more valves, the one or more valves being configured to selectively direct the first pressurized fluid stream to the first set of nozzles and the second set of nozzles and selectively direct the second pressurized fluid stream to the third set of nozzles.

8. The system of claim 7, further comprising an accumulator to provide continuous pressure supply of a purging fluid in response to compression system failure.

9. The system of claim 8, wherein continuous pressure prevents backflow of combustion products from the gas turbine in fluid communication with the combustor, wherein the combustor is arranged and disposed to receive gaseous fuel from the first set of nozzles and liquid fuel from the second set of nozzles.

10. The system of claim 9, wherein the first pressurized fluid stream is directed through the accumulator.

11. The system of claim 1, wherein the first pressurized fluid stream consists essentially of $CO_2$.

12. The system of claim 11, wherein a predetermined pressure of the first pressurized fluid stream is the critical pressure of the fluid.

13. The system of claim 1, wherein the first pressurized fluid stream consists of $CO_2$.

14. The system of claim 1, wherein the first stage of compression and the second stage of compression are separated by a staged compressor and an intercooler.

15. A system, comprising:
a gas turbine engine comprising:
a first set of nozzles;
a second set of nozzles;
a third set of nozzles;
a combustor; and
wherein one of the first, second and third sets of nozzles include at least one liquid fuel nozzle and one of the first, second and third sets of nozzles include at least one gaseous fuel nozzle;
a carbon capture system having a staged compression system, the staged compression system having a first stage of compression and a second stage of compression;
wherein the first stage of compression is configured to receive a first $CO_2$ stream from the carbon capture system and direct the first $CO_2$ stream to the first and second sets of nozzles for purging;
wherein the second stage of compression is configured to receive a second $CO_2$ stream and direct the second $CO_2$ stream to the third set of nozzles for purging;
wherein the first and second $CO_2$ streams are at a concentration greater than the concentration of $CO_2$ in air;
wherein the second $CO_2$ stream is greater in pressure than the first $CO_2$ stream.

16. The system of claim 15, further comprising the gas turbine in fluid communication with the combustor, wherein the combustor is arranged and disposed to receive gaseous fuel from the first set of nozzles and liquid fuel from the second set of nozzles.

17. A system, comprising:
a gas turbine engine comprising:
a first set of nozzles;
a second set of nozzles;
a third set of nozzles;
a combustor;
wherein one of the first, second and third sets of nozzles include at least one liquid fuel nozzle and one of the first, second and third sets of nozzles include at least one gaseous fuel nozzle;
a carbon capture system comprising a staged compression system having at least a first stage of compression and a second stage of compression;
wherein the carbon capture system is configured to selectively direct a first pressurized fluid stream to purge the first set of nozzles and the second set of nozzles from the first stage of compression;
wherein the carbon capture system is configured to selectively direct a second pressurized fluid stream to purge the third set of nozzles from the second stage of compression;
wherein the first and second pressurized fluid streams are non-combustible and include $CO_2$ at a concentration greater than the concentration of $CO_2$ in air; and
wherein the second pressurized fluid stream is greater in pressure than the first pressurized fluid stream.

18. The system of claim 17, further comprising the gas turbine in fluid communication with the combustor, wherein the combustor is arranged and disposed to receive gaseous fuel from the first set of nozzles and liquid fuel from the second set of nozzles.

* * * * *